Feb. 13, 1940.  D. D. WILE  2,190,464

CONTROL DEVICE

Filed Sept. 11, 1936

INVENTOR
Daniel D. Wile
BY Andrew K. Foulds
his ATTORNEY

Patented Feb. 13, 1940

2,190,464

UNITED STATES PATENT OFFICE 2,190,464

CONTROL DEVICE

Daniel D. Wile, Detroit, Mich., assignor to Detroit Lubricator Company, Detroit, Mich., a corporation of Michigan Application September 11, 1936, Serial No. 100,264

13 Claims. (Cl. 50—23)

My invention relates generally to control devices and more particularly to expansion valves for controlling the admittance of a refrigerant medium to a refrigerant evaporator.

One of the objects of my invention is to provide in an expansion valve, new and improved means for dampening vibrations and preventing resultant noise of a spring-suspended valve member.

Another object of my invention is to provide an expansion valve having new and improved means connecting the valve member and the actuating means.

Another object of my invention is to provide an expansion valve having a new and improved diaphragm structure.

Another object of my invention is to provide an expansion valve having a new and improved arrangement of the operating and associated parts thereof.

The invention consists in the improved construction and combination of parts, to be more fully described hereinafter and the novelty of which will be particularly pointed out and distinctly claimed.

In the accompanying drawing, to be taken as a part of this specification, I have fully and clearly illustrated my invention, in which drawing—

Figure 5:
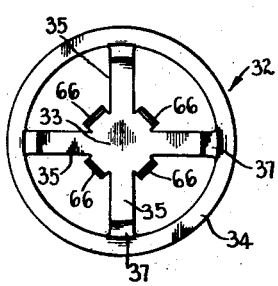
Fig. 5 is a view shown in elevation of a spider or reenforcing member employed in the diaphragm structure of Fig. 4.

Referring to the drawing by characters of reference, my expansion valve has a casing including a body 1 which may be of general cylindrical shape preferably having a longitudinally extending, centrally disposed bored recess 2 that opens through the lower end thereof. In the recessed wall of bore 2 there is preferably provided a bored recess 3 of relatively small diameter that preferably aligns axially with bore 2, and the bore 3 may be internally threaded for receiving a tubular fitting, or valve seat member 4. The valve seat member 4 preferably has an external annular flange 5 that positions in bore 2 and abuts the recessed wall thereof. Preferably the body 1 is provided with an inlet bore 6 for housing a strainer member 7, and the bore 6 may extend longitudinally of the bore 2 and communicate with bore 3 through a laterally extending bore 8. The inlet bore 6 may be connected to a refrigerant supply conduit (not shown) in any suitable manner. Communicating with the centrally disposed bore 2 there is an outlet 9 which may be in the form of a bore than may be internally threaded for connection to a refrigerant evaporator (not shown).

In the present construction the valve seat member 4 is provided with an insert member 10 in its lower end that may be press-fitted or otherwise secured thereto, and the insert member 10 has an aperture or bore 11 therethrough that connects bores 2 and 3 and provides a port and a downwardly facing valve seat 12. The bore 2 provides a valve chamber and flow passage for refrigerant, and disposed therein is a reciprocal valve member 13 preferably having an upwardly directed, conical face 14 for cooperation with the valve seat 12 to control flow of refrigerant through the port. The valve member 13 is preferably carried by a tubular shaped carrier member 15, and an end portion of the valve member 13 may be fitted into the tubular carrier member 15 and the carrier member may have an internal, upwardly facing shoulder 16 on which the valve member 13 may seat. Carried by the carrier member 15 there is an abutment member 17 preferably in the form of a nut, threaded onto the upper end of the carrier member, the nut preferably having an external annular flange 18. The nut or abutment member 17 is preferably threaded only partway onto the tubular carrier member 15 so as to provide an upwardly facing annular space between the outer face of the valve member 13 and the inner wall surface of the nut for receiving solder 20 or other suitable means for securing the carrier member 15, valve member 13 and nut 17 rigidly together.

The bore 2 is closed by a closure member 21 that may screw thread thereinto and the closure member 21 preferably has a centrally disposed, threaded aperture therethrough for receiving a combination adjustment and guide member 22. The guide member 22 preferably has a rod-like portion 23 of reduced diameter that projects into bore 2, and the reduced portion 23 preferably has a slightly enlarged inner end portion 24 that slidably positions in the tubular carrier member 15 for guiding the same. The reduced portion 23 provides an upwardly facing annular shoulder 24ᵃ on the member 22, and seating on the shoulder 24ᵃ within bore 2 there is a plate-like abutment member 25 having a centrally disposed aperture for receiving the reduction portion 23 of member 22. Surrounding the valve carrier member 15 there is a helical coil spring 26 having one end abutting the abutment member 25 and the other end abutting the flange 18 of abutment member 17, the spring 26 being under compression acting to move the valve member 13 toward its seat 12.

Figure 3:
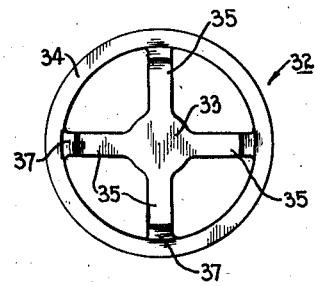
Fig. 3 is a view shown in elevation of one of the parts of my expansion valve.

The upper end wall of the body 1 is recessed, as at 27, and the inner side wall defining the recess is preferably circular in contour and stepped, providing an internal, upwardly facing shoulder or seating surface 28. Seated on the shoulder 28 there is a movable wall means or diaphragm 29 having an upturned, annular flange 30 that preferably lies flat against the inner side wall surface of the body 1. The diaphragm 29 cooperates with the inner side and recessed wall of the body 1 to provide a pressure chamber 30ᵃ that communicates with bore 2 through a connecting bore 31. Positioned flat against each side of the diaphragm 29 and supported on the shoulder 28 there is a plate-like reinforcing member or spider 32, and these members 32 may be of like construction. One of the reenforcing members or spiders 32 is shown in Fig. 3, and as shown, is preferably formed having a centrally disposed plate portion 33 integrally connected to a flat, ring-like border portion 34 by spaced, radially extending, integral arms 35. Spaced inwardly from its outer periphery the diaphragm 29 is preferably provided with the usual continuous embossed, or bent portion 36 to provide for movement of the central portion of the diaphragm, within the confines of the embossed portion, without transmission of such movement, or of strain, to the outer border portion of the diaphragm. Also, the connecting members 35 of each of the reenforcing members 32 are preferably provided with embossed or bent portions 37 so that the central portions 33 of these members may move freely without placing a strain on, or transmitting movement of the border portions 34, and these embossed portions 37 preferably overlie the diaphragm embossed portion 36.

Mounted on the upper end of the body 1 there is a tubular shaped housing or extension member 38 having an open end extending into the body recess and seating on the upper reenforcing member 32, on an outer border portion thereof overlying the annular shoulder 28. The diaphragm 29 cooperates with the housing 38 to provide a closed chamber 38ᵃ. At its lower end the extension member 38 preferably has an outturned annular flange 39, the outer peripheral surface of which preferably engages the inner wall surface of the diaphragm flange 30. An upper end portion of the body 1 and an upper end portion of the diaphragm flange 30 project above the upper face of the housing flange 39 and are bent inwardly leaving, however, an annular space or channel between the extension wall and the bent flange and body wall portion for receiving solder 40, or other suitable means for securing the body 1, diaphragm 29, reenforcing members 32, and extension member 38 together and for sealing chambers 30ᵃ and 38ᵃ.

In the present instance, the extension member 38 is formed having an upwardly extending reduced portion, or neck 42, and between the neck 42 and the flange 39 the extension member has an offset, substantially horizontally disposed wall 43 that is spaced above and is substantially parallel with the diaphragm 29 and serves to limit upward flexing movement thereof. An upper end portion of the neck 42 may be internally threaded to receive an adjustment member 44, preferably an externally threaded closure plug. The closure plug 44 preferably has a bored recess 45 opening through its lower end into the extension member 38, and the recessed wall of the closure plug preferably has a centrally disposed, downwardly directed extended portion 46, a lower end portion of which may be pointed or conical to engage in a recess in the upper face of a removable abutment member 47. Carried by the upper reenforcing member or spider 32, on the upper face thereof, there is a reenforcing or abutment member 48 in the form of a plate, and preferably the plate 48 is welded or otherwise suitably secured to the central or movable portion 33 of the spider 32. The abutment plate 48 is preferably formed having an upwardly extending outer border portion 49 positioned to engage the housing horizontal wall 43 to limit upward flexing movement of the diaphragm 29. Within the extension member 38 there is a helical coil spring 50 having one end, or its upper end, abutting the abutment member 47 and its other, or lower end, abutting the plate 48 that is carried by the upper spider 32. The upper spring abutment member 47 preferably has a centrally disposed, downwardly directed extended portion 51ᵃ that positions within the uppermost coil of the spring 50 and prevents undue lateral movement of the upper end of the spring. The abutment plate 48 preferably has a plurality of spaced, upturned tabs 51 that position around the lower end portion of the spring 50 and limit lateral movement of the lower end of the spring. The spring 50 is under compression and acts to flex the diaphragm 29 in a downward direction.

Carried by the lower reinforcing member or spider 32, on the underside thereof, there is a reenforcing or abutment plate 52 that is preferably welded or otherwise suitably secured to the central or movable portion 33 of member 32. Disposed in spaced relation around the valve seat member 4 there are a plurality of apertures or bores extending longitudinally of the body 1 through the wall separating bore 2 and the recessed end of the body, and these bores slidably receive thrust members or pins 53, the upper ends of which project into chamber 30ᵃ and abut the underside of the plate 52. In the present instance, there are three of the pins 53 and these pins project into bore 2 and their lower ends abut a removable abutment member 54 carried by the abutment member or nut 17 of the valve structure. An upper end portion of the nut 17 is preferably spherical in shape or has a convex surface, and the abutment plate 54 has a centrally disposed aperture therethrough providing a socket for receiving an upper end portion of the nut, the diameter of the aperture being such that the plate 54 seats on the spherical surface of the nut. By this arrangement the abutment plate 54 is free to move or cant so that the pressure exerted on the plate through the pins 53 will always be distributed equally between the pins. Adjacent their lower ends within bore 2, each of the pins 53 is preferably provided with an external annular groove or slot 55, these grooves preferably being in substantially the same horizontal plane. Engaging in the grooves 55 there is preferably provided a coil spring 56 that encircles the three pins 53 and is under tension urging the pins inwardly tending to cant the pins. The spring 56 increases the friction between the pins 53 and the walls of their apertures or bores sufficiently to dampen vibration of the spring-suspended valve 13 so that the valve will reciprocate smoothly and so-called chattering of the valve, due to impact of the valve with its seat, will be substantially eliminated.

The upper coil spring 50 acts with the pressure in chamber 30ª to move the valve 13 away from its seat, and the force exerted by the spring 50 may be varied or regulated by rotating the closure plug 44. In the present instance, the plug 44 is provided with an arcuate slot or groove 58 in its upper end for receiving a key 59 by means of which the plug may be conveniently rotated to regulate the force exerted by spring 50. Enclosing the key 59 and the upper end of the extension member 38 there is a so-called expansible breather cap 60 that may be formed of rubber. The breather cap 60 has a neck portion 61, the inner diameter of which is preferably smaller than the outer diameter of the neck 42 when the rubber is in its inert form, so that when the neck of the cap is stretched over the neck of the extension member 38 the rubber of the cap neck 61 will be under tension and will tightly engage the outer wall surface of the extension member neck to provide a good fluid-tight seal therebetween. In the end wall of the closure plug 44 there is an aperture 62 therethrough providing communication between the interior of the cap 60. When the diaphragm structure is flexed upwardly, air from the interior of the extension member 38 passes into the breather cap 60 causing the breather cap to expand, which prevents undue resistance of the air to the upward flexing action of the diaphragm.

Figure 4:
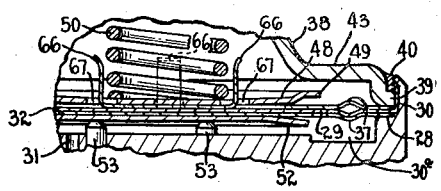
Fig. 4 is a fragmentary view shown in cross section of a modified form of diaphragm construction for my expansion valve.
Figure 1:
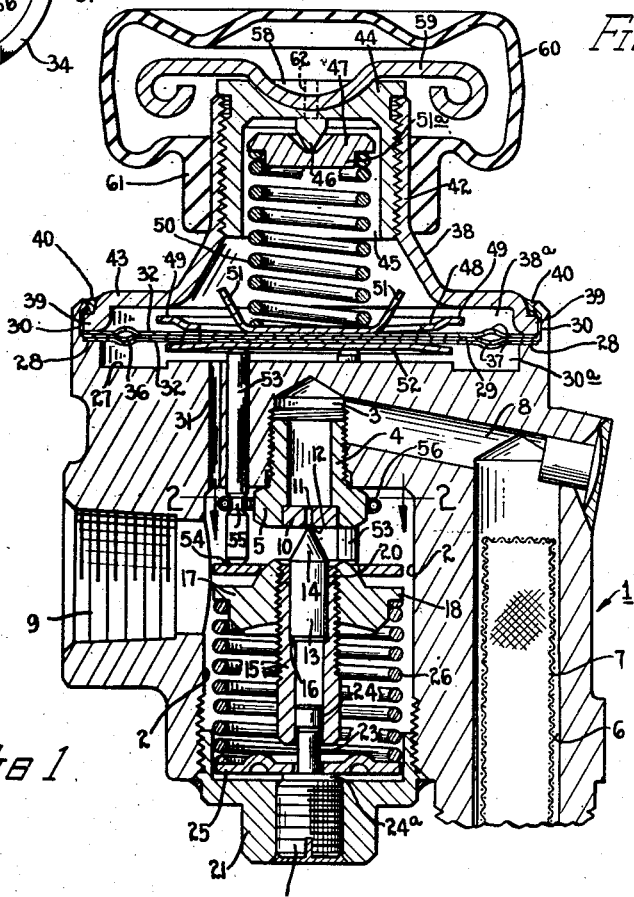
Figure 1 is a view shown in vertical central cross section of my improved expansion valve.
Figure 2:
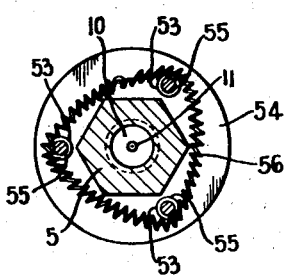
Fig. 2 is a view taken along the line 2—2 of Fig. 1 showing structural details of my expansion valve.

Referring to the modified form of my diaphragm structure shown in Figs. 4 and 5, this structure is similar to that shown in Fig. 1 but differs therefrom in that the upper spider or reenforcing member, instead of the abutment plate 48, has the upwardly directed extended portions or fingers, designated at 66, for limiting lateral or side movement of the thrust member or spring 50. The abutment plate 48 is provided with a plurality of apertures 67 therethrough positioned around and outwardly of the spring 50 for receiving the extended portions or fingers 66 which project therethrough into chamber 38ª. The extended portions or fingers 66 may be formed out of the reenforcing plate, as shown in Fig. 5, and besides serving to limit lateral movement of the lower end of the spring 50, they also limit lateral movement of the abutment plate 48 which may be loosely supported on the diaphragm instead of being welded to the spider, as in the construction of Fig. 1. The fingers 66 extend upwardly, longitudinally of the spring 50, and are preferably spaced from the spring, or define a space slightly larger than the diameter of the spring so that the spring will have slight lateral movement and will not be placed under any undue side strain.

The operation of my herein described expansion valve in connection with a refrigerating system is as follows: The force exerted by the spring 50 through the diaphragm 29 and thrust members 53 on the valve member 13 tends to move the valve member away from its seat, while the force exerted by the spring 26 plus the force exerted by the refrigerant medium on the diaphragm 29 tends to move the valve toward its seat. Thus the difference between the opposed forces exerted by the springs 50 and 26 will determine the pressure which will be maintained in the chamber 30ª, and consequently will determine the pressure which will be maintained in a refrigerant evaporator with which the valve is employed. For example, if the pressure in chamber 30ª remained constant then the opposing forces acting to move the valve in opposite directions would be in balanced relation and the valve member 13 would be seated. However, the pressure within the evaporator and consequently the pressure in chamber 30ª fluctuates, which causes the opposing forces to become unbalanced and throttle the valve to maintain the pressure in chamber 30ª substantially constant or within predetermined pressure limits. When the valve is throttled, refrigerant enters valve chamber 2 through the valve controlled port 11 and passes from chamber 2 through outlet 9 into the evaporator. As the pressure in the evaporator approaches the desired pressure the valve throttles down to decrease the port capacity and amount of refrigerant supplied to the evaporator. By means of the adjustment member 44 the force exerted by the upper spring 50 may be varied to change the differential between the forces exerted by springs 50 and 26 and thereby regulate the pressure to be maintained in the evaporator.

What I claim and desire to secure by Letters Patent of the United States is:

1. In an expansion valve for controlling flow of a refrigerant medium, a body, a reciprocal valve member controlling flow through said body, means operable for moving said valve member in one direction, means operable for moving said valve member in the opposite direction, an abutment member adjustably supported on said valve member for free universal movement relative thereof, and a plurality of thrust members having universal engagement with said abutment member and operatively connecting said valve member and said first-named means.

2. A valve comprising a body, a reciprocal valve member for controlling flow through said body, means operable for actuating said valve member, a plurality of thrust members operatively connecting said valve member and said actuating means, an abutment member for transmitting movement from said thrust members to said valve member, and means supporting said abutment member for universal movement relative to said thrust members and to said valve member so that each of said thrust members will transmit substantially equal force from said actuating means to said valve member.

3. In an expansion valve for controlling flow of a refrigerant medium, a body, a reciprocal valve member controlling flow through said body and having a convex bearing surface, means operable for moving said valve member in one direction, means operable for moving said valve member in the opposite direction, an abutment member carried by said valve member and having a substantially circular seat engaging said convex bearing surface so that said valve member and said abutment member are in universally adjustable engagement, and a plurality of spaced thrust members having universal engagement with said abutment member and operatively connecting said valve member and said second-named means so that each of said thrust members will transmit substantially equal force from said second-named moving means to said valve member.

4. A valve comprising a body member having a passageway therethrough with a valve port, a valve member controlling flow through said port, said body member having a pressure chamber separate from said passageway, a pressure responsive movable member subject to fluid pressure positioned in said chamber and movable on change of fluid pressure therein, said body member having a guide bore and a pressure conveying conduit, said bore and said conduit each extending from said chamber to said passageway, a thrust member operatively connecting said movable member to said valve member and extending through said bore, and resilient means urging said thrust member laterally into frictional engagement with the wall of said bore so that vibration of the valve member in operation will be dampened.

5. In an expansion valve, a hollow body member having an internal wall separating said member internally into a valve chamber and an expansible chamber, a diaphragm forming one wall of said expansible chamber, said body member having a passageway for transmission of pressure between said chambers to flex said diaphragm in one direction, means acting to flex said diaphragm in the opposite direction, a reciprocal valve member in said valve chamber controlling flow through said body member, resilient means for moving said valve member in one direction, said body member wall having a plurality of spaced apertures therethrough, a plurality of reciprocal thrust rods positioned one in each of said apertures with their opposite ends projecting into said chambers and engaging said diaphragm and said valve member, and a tension spring encircling and engaging said thrust rods to increase the friction between the rods and the walls of their apertures to dampen vibrations of said resilient means.

6. In a valve of the character described, a body member having a passageway therethrough including a valve port and a valve chamber, a valve member in said chamber and cooperable with said port, a longitudinally adjustable rotary guide member projecting into said chamber and slidably receiving said valve member, said guide member having a shoulder, an apertured abutment member seating on said shoulder and surrounding and movable relative to said guide member, and a helical coil spring in said chamber adjustable by rotation of said guide member and held under compression between said valve member and said abutment member, the engagement of said spring with said abutment member being spaced substantially outward laterally from the engagement of said abutment with said shoulder, said abutment member being movable on said shoulder relative to said guide member to equalize the force of said spring on said valve member.

7. In a valve of the character described, a body member having a passageway therethrough including a valve port and a valve chamber, a valve member in said chamber and cooperable with said port, an abutment member in said chamber, means supporting said abutment member for universal movement on said valve member, said body member having a plurality of guide bores opening into said valve chamber in surrounding relation to said valve port and substantially parallel to said valve member, a thrust member in each of said bores and having abutting engagement with said abutment member so that said abutment member can have universal movement relative to said thrust members, and a common means acting on all of said thrust members to move said valve member relative to its port, the universal engagement of said abutment member with said valve member and said thrust members compensating for variation in length of said thrust members so that said thrust members will transmit equally the force exerted by said common means.

8. In a valve of the character described, a body member having a passageway therethrough including a valve port and a valve chamber, a valve member in said chamber and cooperable with said port, said body member having a plurality of guide bores surrounding said port and extending substantially parallel to said valve member, a plurality of thrust members positioned one in each of said bores and extending into said valve chamber, means operatively connecting said thrust members to said valve member, automatically acting means engaging said thrust members and acting through said thrust members to move said valve member, and means urging said thrust members into engagement with the walls of their bores to frictionally resist movement of said valve member by said automatic means.

9. In a valve of the character described, a body member having a passage way therethrough included a valve port and a valve chamber, a valve member in said chamber and cooperable with said port, said body member having a plurality of guide bores surrounding said port and extending substantially parallel to said valve member, a plurality of thrust members positioned one in each of said bores and extending into said valve chamber, means operatively connecting said thrust members to said valve member, automatically acting means engaging said thrust members and acting through said thrust members to move said valve member, a helical coil spring in surrounding relation to said valve member and acting on each of said thrust members to urge said thrust members into frictional engagement with the walls of their bores, and means holding said spring in fixed relation to said thrust members.

10. In a valve of the character described comprising a body member having a passageway therethrough including a valve port and a valve chamber, a valve member in said chamber and cooperable with said port, a guide post alined with said port and projecting into said chamber from the wall of said body member, said valve member having a guide bore slidably receiving said post, a supporting member adjustably mounted on said valve member and having a curved bearing surface, a seat member having an aperture therethrough receiving said post, a helical coil spring surrounding said post and said valve member and held under compression between said supporting member and said seat member to urge said valve member toward port closing position, an abutment member universally mounted on said supporting member and seating on said curved surface, a plurality of thrust members seating against said abutment member so that said abutment member is universally movable relative to said thrust members, and value actuating means acting through said thrust members in opposition to said spring.

11. A device of the character described, a casing, a wall in said casing having a plurality of apertures therethrough, a force transmitting member on one side of said wall and operable to move in one direction, a plurality of thrust members extending through said plurality of apertures, said thrust members having operative engagement with said force transmitting member, a movable member on the other side of said wall from said one side and operatively engaged by and for movement in one direction by said force transmitting member, and spring means connecting and urging said thrust members into frictional engagement with the walls of said apertures through which said thrust members extend.

12. A device of the character described, a casing, a wall in said casing having a plurality of apertures therethrough, a force transmitting member on one side of said wall and operable to move in one direction, a plurality of thrust members extending through said plurality of apertures, said thrust members having operative engagement with said force transmitting member, a movable member on the other side of said wall from said one side and operatively engaged by and for movement in one direction by said force transmitting member, and spring means surrounding and urging said thrust members into frictional engagement with the walls of said apertures through which said thrust members extend.

13. A device of the character described, a casing, a wall in said casing having a plurality of apertures therethrough, a force transmitting member on one side of said wall overlying said apertures and operable to move in one direction, a plurality of thrust members extending through said plurality of apertures, said thrust members having one end thereof abutting said force transmitting member, a movable member on the other side of said wall from said one side, said thrust members having the other end thereof abutting said movable member for movement in one direction, and spring means connecting and urging said thrust members into frictional engagement with the walls of said apertures through which said thrust members extend.

DANIEL D. WILE.